(12) United States Patent
Szylakowski et al.

(10) Patent No.: US 11,367,541 B2
(45) Date of Patent: *Jun. 21, 2022

(54) FIRE RESISTANT DATA COMMUNICATION CABLE

(71) Applicant: General Cable Technologies Corporation, Highland Heights, KY (US)

(72) Inventors: Gregg Raymond Szylakowski, Loveland, OH (US); Scott M. Brown, Independence, KY (US)

(73) Assignee: GENERAL CABLE TECHNOLOGIES CORPORATION, Highland Heights, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,185

(22) Filed: Feb. 4, 2021

(65) Prior Publication Data

US 2021/0158994 A1 May 27, 2021

Related U.S. Application Data

(63) Continuation of application No. 16/366,380, filed on Mar. 27, 2019, now Pat. No. 10,937,569.

(60) Provisional application No. 62/649,197, filed on Mar. 28, 2018.

(51) Int. Cl.
| | |
|---|---|
| *H01B 7/02* | (2006.01) |
| *H01B 7/295* | (2006.01) |
| *H01B 7/29* | (2006.01) |
| *H01B 11/02* | (2006.01) |
| *H01B 3/44* | (2006.01) |
| *C09K 21/02* | (2006.01) |
| *H01B 3/48* | (2006.01) |
| *C08K 3/22* | (2006.01) |

(52) U.S. Cl.
CPC ............ *H01B 7/295* (2013.01); *C09K 21/02* (2013.01); *H01B 3/441* (2013.01); *H01B 3/485* (2013.01); *H01B 7/292* (2013.01); *H01B 11/02* (2013.01); *C08K 3/22* (2013.01); *C08K 2003/2224* (2013.01); *C08K 2003/2227* (2013.01)

(58) Field of Classification Search
CPC ... H01B 7/02; H01B 7/04; H01B 7/06; H01B 7/18
USPC .............................. 174/110 R, 113 C, 113 R
See application file for complete search history.

(56) References Cited

U.S. PATENT DOCUMENTS

| | | | | |
|---|---|---|---|---|
| 3,971,882 | A * | 7/1976 | Alia ......................... | C08K 3/22 174/110 SR |
| 5,024,506 | A * | 6/1991 | Hardin ................... | H01B 7/295 385/102 |
| 6,133,367 | A * | 10/2000 | Arhart ..................... | C08L 23/08 524/515 |
| 6,686,537 | B1 * | 2/2004 | Gareis .................... | H01B 7/292 174/110 R |
| 9,424,964 | B1 * | 8/2016 | Kithuka ............. | H01B 11/1008 |

(Continued)

*Primary Examiner* — William H. Mayo, III
(74) *Attorney, Agent, or Firm* — Ulmer & Berne LLP

(57) ABSTRACT

Data communication cables include twisted wire pairs, a fire retardant tape, a metallized tape shield, a braided metallic shield, and a jacket layer. The fire retardant tape surrounds the twisted wire pairs has an overlap of about 15% to about 25%. The data communication cables are also halogen-free and may pass the fire retardant standards of National Fire Protection Agency ("NFPA") 130.

20 Claims, 2 Drawing Sheets

(56) References Cited

U.S. PATENT DOCUMENTS

2003/0103742 A1* 6/2003 Auvray ............... G02B 6/4436
385/109
2015/0129277 A1* 5/2015 Siripurapu ............... H01B 7/02
174/103

* cited by examiner

FIRE RESISTANT DATA COMMUNICATION CABLE

CROSS-REFERENCE TO RELATED APPLICATIONS

The present application is a continuation of U.S. patent application Ser. No. 16/366,380, filed Mar. 27, 2019, which claims priority of U.S. Provisional Patent Application Ser. No. 62/649,197, filed Mar. 28, 2018, and hereby incorporates the same applications herein by reference in their respective entireties.

TECHNICAL FIELD

The present disclosure generally relates to data communication cables for transit applications having improved fire resistance qualifications.

BACKGROUND

Heavy industries, such as railway transit operators, require reliable transmission of increasingly large amounts of data for uses such as systems operation, logistics, and security. Data communication cables, such as Category 5e and Category 6 cables standardized by ISO/IEC 11801, can provide high throughput data communication over relatively long-distances through the use of a plurality of twisted wire pairs. Twisted wire pairs use differential signaling to attenuate electromagnetic interference and to reduce crosstalk between adjacent twisted wire pairs. Cable designs capable of passing the necessary electrical requirements of ISO/IEC 11801 can make it difficult, however, for the cables to meet the fire resistance qualifications required for industrial applications.

US Patent App. Pub. No. 2013/0161058 discloses cables that comprise a core that has at least one conductor, a dielectric barrier layer that surrounds the core, and a conductive shield that surrounds the core. The dielectric barrier layer is formed of a substantially non-flammable material and is devoid of fluoropolymers.

U.S. Pat. No. 9,589,703 discloses data cables including a plurality of insulated conductors, an intumescent tape surrounding one or more of the insulated conductors, and a jacket. The data cables can be fluoropolymer-free or halogen-free.

SUMMARY

According to one embodiment, a data communication cable includes a plurality of twisted wire pairs, a fire retardant tape surrounding the plurality of twisted wire pairs, and a jacket layer. The fire retardant tape has an about 15% to about 25% overlap. The entire data communication cable is halogen-free.

DETAILED DESCRIPTION

Industrial cables, including data communication cables, must pass a variety of durability and safety requirements. For example, cables used for transit applications, such as fixed guideway transit and passenger rail applications, must pass the fire protection and life safety requirements of National Fire Protection Agency ("NFPA") 130 (2017). The present disclosure generally relates to halogen-free twisted pair data communication cables having improved fire resistance characteristics which pass the requirements of NFPA 130.

As can be appreciated, data communication cables generally include a plurality of twisted wire pairs surrounded by a jacket layer. It has been discovered that a halogen-free data communication cable, meeting the requirements of NFPA 130, can be constructed through inclusion of a fire retardant tape surrounding the twisted wire pairs. Such data communication cables can meet the standards of ANSI/TIA-568-C.2 (2009) of the American National Standards Institute ("ANSI") and the Telecommunications Industry Association ("TIA") for Category 5e, Category 6, and Category 6A cables. As used herein, halogen-free means that halogenated compounds are not specifically included in any of the components of the data communication cable and if present, are found only in incidental amounts.

Example cross-sectional diagrams of certain data communication cables are illustrated in the accompanying drawings. Those of ordinary skill in the art will understand that the cables described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Figure 1:
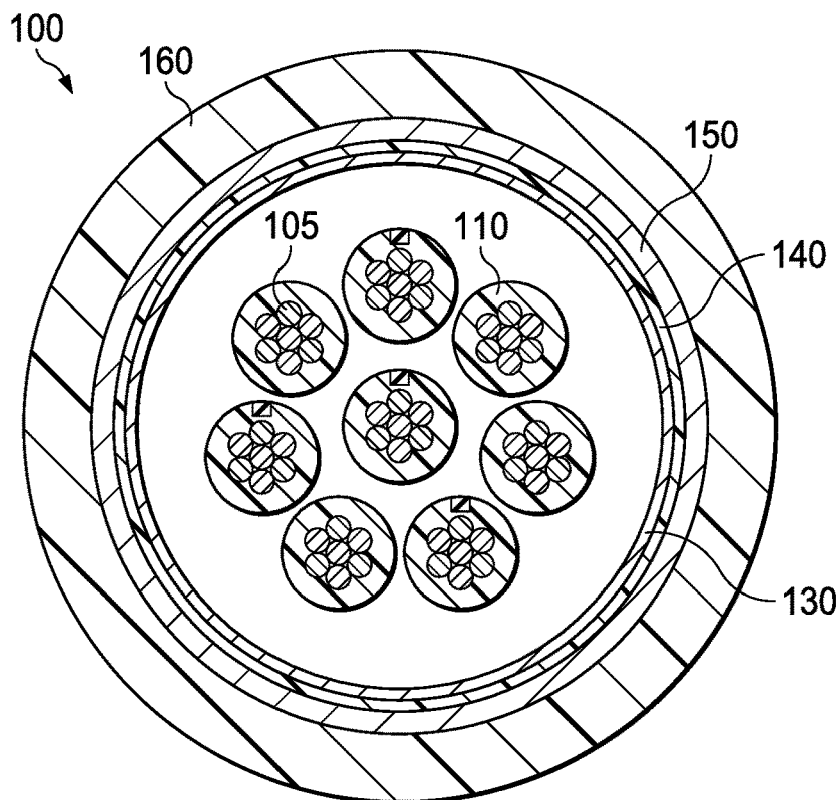
FIG. 1 depicts an illustration of a cross-sectional area of a Category 5e data communication cable according to one embodiment.

FIG. 1 depicts a cross-sectional diagram of a data communication cable 100 capable of meeting the requirements of NFPA 130 as well as the requirements of a Category 5e cable. The cable 100 depicted in FIG. 1 includes eight 24 AWG 7/32 tinned copper conductors 105 surrounded by 0.007 inch thick high density polyethylene ("HDPE") insulation 110 which are twisted to form twisted wire pairs (not shown). The cable 100 further includes a 1 inch wide, 0.007 inch thick fire retardant tape 130 surrounding the twisted wire pairs (not shown). The fire retardant tape 130 has an overlap of about 15% to about 25%. Surrounding the fire retardant tape 130, the cable 100 includes an aluminized mylar shield 140 with aluminum facing outwards and a braided tinned copper shield 150 with greater than 60% coverage of the underlying cable. An about 0.59 mm to about 0.69 mm thick jacket layer 160 surrounds the braided tinned copper shield. The jacket layer 160 is formed from a halogen-free crosslinked polyolefin.

Figure 2:
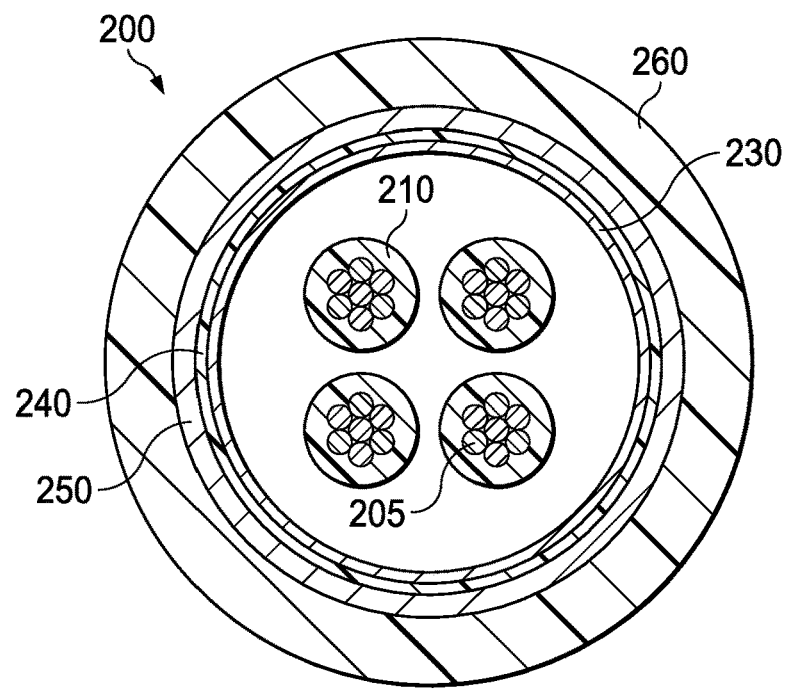
FIG. 2 depicts an illustration of a cross-sectional area of a Category 5e data communication cable with two twisted wire pairs according to another embodiment.

FIG. 2 depicts a cross-sectional diagram of a data communication cable 200 capable of meeting the requirements of NFPA 130 as well as the requirements of a Category 5e cable. The cable 200 includes only 2 twisted wire pairs (not shown) formed from four 22 AWG 7/30 tinned copper conductors 205 surrounded by 0.18 mm thick HDPE insulation 210. The cable 200 further includes a 1 inch wide, 0.007 inch thick fire retardant tape 230 surrounding the twisted wire pairs (not shown). The fire retardant tape 230 has an overlap of about 15% to about 25%. Surrounding the fire retardant tape 230, the cable of FIG. 2 includes an aluminized mylar shield 240 with aluminum facing outwards and a braided tinned copper shield 250 with greater than 60% coverage of the underlying cable. An about 0.59 mm to about 0.69 mm thick jacket layer 260 surrounds the braided tinned copper shield. The jacket layer 260 is formed from a halogen-free crosslinked polyolefin.

Figure 3:
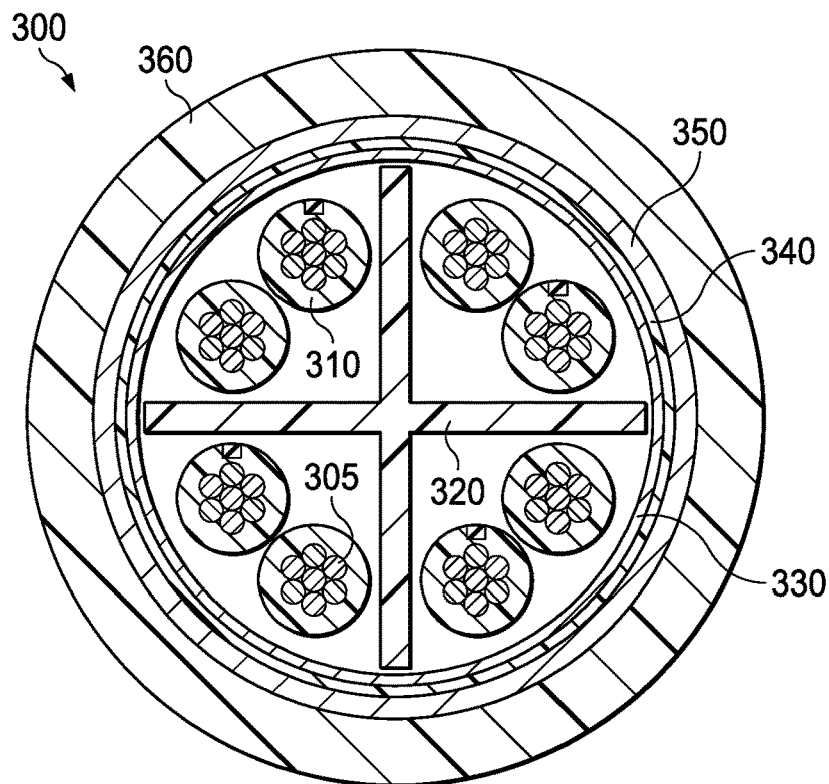
FIG. 3 depicts an illustration of a cross-sectional area of a Category 6 data communication cable according to another embodiment.

FIG. 3 depicts a cross-sectional diagram of a data communication cable 300 capable of meeting the requirements of NFPA 130 as well as the requirements of a Category 6 cable. The cable 300 differs from the cables of FIGS. 1 and 2 through the inclusion of a cross-web separator 320 having a wall thickness of 0.5 mm and a 4.5 mm width. The cable 300 includes eight 24 AWG 7/32 tinned copper conductors 305 surrounded by 0.007 inch thick HDPE insulation 310. The conductors 305 are twisted to form twisted wire pairs (not shown). The cable 300 further includes a 1 inch wide, 0.007 inch thick fire retardant tape 330 surrounding the twisted wire pairs (not shown). The fire retardant tape 330 has an overlap of about 15% to about 25%. Surrounding the fire retardant tape 330, the cable 300 includes an aluminized mylar shield 340 with aluminum facing outwards and a braided tinned copper shield 350 with greater than 60% coverage of the underlying cable. An about 0.59 mm to about 0.69 mm thick jacket layer 360 surrounds the braided tinned copper shield 350. The jacket layer 360 is formed from a halogen-free crosslinked polyolefin.

Figure 4:
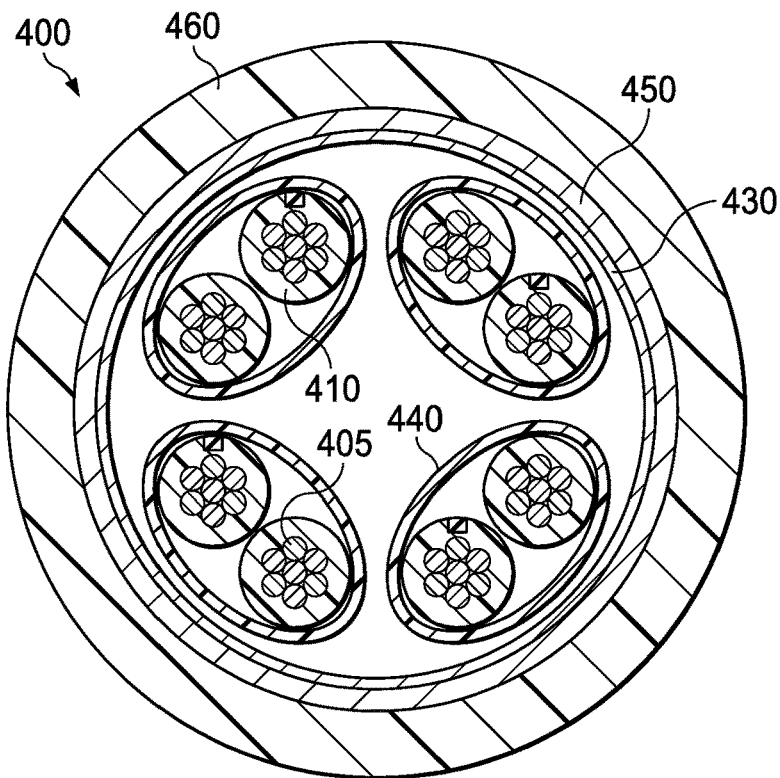
FIG. 4 depicts an illustration of a cross-sectional area of a Category 6 or Category 6A data communication cable according to another embodiment.

FIG. 4 depicts a cross-sectional diagram of a data communication cable 400 capable of meeting the requirements of NFPA 130 as well as the requirements of a Category 6 or Category 6A cable. The cable 400 differs from the cables of FIGS. 1 to 3 through inclusion of 4 aluminized mylar shields 440 around each of the twisted wire pairs (not shown). The cable 400 includes eight 24 AWG 7/32 tinned copper conductors 405 surrounded by 0.007 inch thick HDPE insulation 410. The conductors 405 are twisted to form twisted wire pairs (not shown). The cable 400 further includes a 1 inch wide, 0.007 inch thick fire retardant tape 430 surrounding the twisted wire pairs (not shown). The fire retardant tape 430 has an overlap of about 15% to about 25%. A braided tinned copper shield 450 surrounds the fire retardant tape 430 with greater than 60% coverage of the underlying cable. An about 0.59 mm to about 0.69 mm thick jacket layer 460 surrounds the braided tinned copper shield 350. The jacket layer 460 is formed from a halogen-free crosslinked polyolefin.

Generally, suitable fire retardant tapes for the construction of the halogen-free data communication cables described herein can include any tapes formed from non-flammable materials and impregnated with fire retardant additives. For example, suitable fire retardant tapes can include woven glass fabric tapes incorporating one or more zero halogen flame retardants within the tape. In certain embodiments, suitable zero halogen flame retardants can include magnesium hydroxide and/or aluminum trihydrate.

Generally, suitable fire retardant tapes can be formed from any of a variety of materials that offer the necessary mechanical and electrical performance. For example, suitable fire retardant tapes can be formed from one or more of fiberglass, individual glass fibers bunched together, fiberglass yarns, fiberglass strands, fiberglass rovings, chopped fiberglass, woven sheets, basalt fibers, and high temperature ceramic mica in certain embodiments. As can be appreciated, these materials are non-flammable, offer high temperature performance, and are substantially devoid of components which can drip or smoke when exposed to fire.

Suitable fire retardant tapes can also be commercially obtained. For example, suppliers such as Neptco, Inc. (Pawtucket, R.I.) commercially distribute suitable fire retardant tapes under the Powerline® and Neptape® (e.g., Neptape® NTS188) labels.

Generally, a fire retardant tape can be applied in any suitable fashion. For example, a fire retardant tape can be longitudinally or helically applied around the twisted wire pairs. In certain embodiments, the fire retardant tape can be about 25.4 mm (about 1 inch) wide, 0.177 mm (about 7 mils) thick, and can be longitudinally applied around the twisted wire pairs with about 15% to about 25% overlap. As can be appreciated however, the dimensions and overlap of a fire retardant tape can vary. For example, suitable fire retardant tapes can have a thickness of about 0.0254 mm (about 1 mils) to about 0.381 mm (about 15 mils) in certain embodiments, a thickness of about 0.076 mm (3 mils) to about 0.254 mm (10 mils) in certain embodiments, or about 5 mils to about 9 mils in certain embodiments. Fire retardant tapes can have a width of about 2.54 mm (about 0.10 inches) to about 76.2 mm (about 3 inches) in certain embodiments, and a width of about 12.7 mm (0.5 inch) to about 38.1 mm (1.5 inch) in certain embodiments. The fire retardant tape can vary from non-overlapping (e.g., having about 20% or less of the underlying cable exposed) to about 80% overlapping coverage in certain embodiments, including, for example, about 5% to about 30% overlapping in more specific embodiments.

Inclusion of fire retardant tapes as described herein can improve the fire resistance of data communication cables and, in combination with other suitable cable components, can enable data communication cables to pass the requirements of NFPA 130 while being constructed from halogen-free components. Generally, the data communication cables described herein can further include at least a plurality of twisted wire pairs, one or more cable shields, and a jacket layer.

Each of the twisted wire pairs can generally be formed from two insulated wires. Each of the insulated wires can include a conductive wire and an insulation layer. The conductive wire can be solid, or stranded, and can be formed of any suitable conductive metal such as one or more of copper, aluminum, steel, and silver. In certain embodiments, the conductive wire can advantageously be formed of copper due to copper's high electrical conductivity relative to its volume.

As can be appreciated, stranded wire can be advantageous in certain embodiments due to the mechanical and electrical advantages exhibited by stranded wire. For example, stranded wires can exhibit increased flexibility and conductivity compared to a solid wire of identical gauge. In certain embodiments, the conductive wire can be a stranded copper wire.

Generally, the insulated wires can be of any suitable wire gauge. For example, in certain embodiments, the insulated wires can be sized in accordance to American Wire Gauge ("AWG") standards and each wire can have a size between 18 AWG and 32 AWG. For example, suitable data communication cables can include eight 26 AWG insulated wires or eight 24 AWG insulated wires in certain embodiments. As can be appreciated, selection of the wire gauge can vary depending on factors such as the desired cable operating distance, the desired electrical performance, and physical parameters such as the thickness of the cable.

The insulated wires can be coated with any suitable insulating material which can provide the desired electrical properties. For example, suitable insulation layers can be formed of halogen-free polyolefins in certain embodiments. In certain embodiments, a suitable halogen-free polyolefin can be a low-smoke, zero halogen polyolefin such as polyethylene. Such low-smoke, zero halogen polyolefins can be preferred due to the desirable fire resistance characteristics of such materials. In certain embodiments, the insulation layers can be formed of high-density polyethylene ("HDPE").

The thickness of the insulation layer of an insulated wire can vary depending on the desired electrical performance. For example, the thickness of the insulation layer for each insulated wire of a twisted wire pair can be about 0.05 mm to about 0.40 mm thick in certain embodiments, about 0.10 mm to about 0.30 mm thick in certain embodiments, or about 0.17 mm to about 0.25 mm thick in certain embodiments. As can be appreciated, the thickness of the insulation layer can also vary depending on the wire gauge of the conductive wire. For example, 24 AWG insulated wires can include an insulation layer having a thickness of about 0.25 mm while 22 AWG insulated wires can include an insulation layer having a thickness of about 0.18 mm. The insulation resistance can be about 1,000 mΩ/km or greater.

Generally, the number of twisted wire pairs can be varied depending on the data throughput required for various applications. For example, in certain embodiments, two twisted wire pairs can be included while in other certain embodiments, four twisted wire pairs can be included. The number of twisted wire pairs can influence the thickness of the data communication cable with a cable including only four conductive wires being thinner than a similar cable constructed with eight conductive wires. The insulated wires can be twisted together to form a twisted wire pair as known in the art. Collectively, the twisted wire pairs can also be twisted to form a cable core as known in the art. Generally, the twist rates of the insulated wires can be similar to the twist rates and tolerances of known Category 5e, Category 6, and Category 6A cables.

In certain embodiments, the data communication cables described herein can include one or more cable shields to improve the electrical performance of the cable. As can be appreciated, cable shields, such as metallic shields and metallized tape, attenuate electromagnetic interference ("EMI") and can reduce electrical noise from both outside the cable as well as from adjacent twisted wire pairs.

As can be appreciated, a variety of cable shields can be useful for the data communication cables described herein. For example, suitable cable shields can be formed of metallic foil, braided metal, woven metal, metallized tape, or semi-conductive polymers. As can be appreciated, selection of the cable shield can vary depending on factors such as the required reduction in EMI and required cable flexibility.

In certain embodiments, the data communication cables described herein can include a metallized tape. Metallized tapes generally refer to polymeric films which are metallized through application of a deposited metal such as aluminum, copper, or gold. For example, a continuous metallized polyethylene terephthalate tape (e.g., Mylar® from DuPont Teijin Films of Wilmington, Del.) with an aluminum metallic coating can be a suitable metallized tape in certain embodiments.

Generally, metallized tapes can be applied around either all of the twisted wire pairs and/or can be applied around individual twisted wire pairs. For data communication cables requiring improved electrical performance, it can be useful for the metallized tape to be applied around the individual twisted wire pairs. For example, certain data communication cables meeting the requirements of Category 6 or Category 6A cables can include a metallized tape around the individual twisted wire pairs. Generally, metallized tapes can be applied longitudinally or helically.

In certain embodiments, the data communication cables described herein can also, or alternatively, include a metallic shield. In such embodiments, the metallic shield can surround either the metallized tape or can surround the twisted wire pairs. In certain embodiments, metallic shields can be braided metallic shields and can provide about 60% or greater coverage or shielding. In certain embodiments, a data communication cable described herein can include a braided, tinned, copper shield which provides about 60% or greater coverage.

In certain embodiments, a cable shield can further include a drain wire. Drain wires can be formed of any suitable metal. For example, in certain embodiments, the drain wire can be a 7× tinned copper drain wire. The drain wire can be formed of any suitable gauge of wire. In certain embodiments, a relatively small gauge wire such as, for example, a 26 AWG cable can be preferred to minimize the bulkiness of a data communication cable described herein.

In certain embodiments, the data communication cables described herein can include both a metallized tape and a metallic shield.

Jacket layers can be included in a data communication cable to provide mechanical durability to the cable. As can be appreciated, the jacket layer is the outermost layer of the cable and can be formed of any suitable polymeric composition which can provide mechanical durability to the cable. In certain embodiments however, it can be particularly advantageous to form the jacket layer from a halogen-free crosslinked polyolefin. Halogen-free crosslinked polyolefins exhibit high durability, as necessitated for industrial applications, and do not release halogenated chemicals when burned. Generally, suitable polyolefins can vary widely and can include polyethylene, ethylene vinyl acetate ("EVA"), ethylene acrylic acid, ethylene methyl acrylate, ethylene ethyl acrylate, and ethylene butyl acrylate copolymers.

In certain embodiments, the jacket layer can include fire retardant additives. Inclusion of a halogen-free fire retardant additive such as one or more of magnesium hydroxide and aluminum trihydrate can improve the flame performance of the jacket layer without detrimentally impacting the mechanical performance of the jacket. In certain such embodiments, fire retardant additives can be included at about 30% to about 75%, by weight.

The jacket layer can generally be crosslinked through any suitable crosslinking process such as an electron beam ("e-beam") curing process. As can be appreciated, the jacket layer can alternatively be crosslinked as known in the art through, for example, radiation cross-linking, heat cross-linking, addition cross-linking, platinum cured cross-linking, silane cross-linking agents, and peroxide cross-linking agents. Crosslinking of the jacket layer can enable the data communication cables described herein to meet the requirements of Underwriter's Laboratory ("UL") Standard 444.

The jacket layer can be of suitable thickness to provide mechanical durability to the data communication cable. For example, the jacket layer can have a thickness of about 0.40 mm to about 0.80 mm in various embodiments including any values between about 0.40 mm to about 0.80 mm such as about 0.59 mm to about 0.69 mm, etc.

As can be appreciated, the data communication cables can include further components in certain embodiments. For example, in certain embodiments, a cable separator, such as a cross-web can be included to further provide mechanical and electrical separation between each of the twisted wire pairs. Use of a cable separator can improve the electrical performance characteristics of the data communication cable and can, for example, enable the cable to meet the performance requirements of Category 6 or Category 6A cables. In certain embodiments, suitable cable separators can be formed of halogen-free materials such as a low-smoke, zero halogen, polyolefin such as polyethylene. Generally, the cable separator can be formed in any suitable shape such as a cross web separator, tape separator, star separator, etc. In certain embodiments, the cable separator can be foamed to improve fire resistance and electrical performance.

In certain embodiments, each of the insulation layers and the jacket layer can include additives such as processing aids or colorants. For example, it is customary to include blue, green, brown, and orange colorants in the insulation of the insulated wires to aid in the termination of twisted wire pairs. In certain embodiments, colorants can also be included in the jacket layer.

The data communication cables described herein can meet a variety of desirable performance standards. For example, the data communication cables can generally meet the requirements of NFPA 130 and can be suitable for use in the transit industry despite being formed of halogen-free materials. The data communication cables can meet the requirements of TIA-568-C.2 to be called a Category 5, Category 5e, Category 6, or Category 6A cable in certain embodiments. Additionally, the cables can meet the requirements of National Electrical Code ("NEC") Article 800 and be RoHS compliant.

Generally, the data communication cables described herein can be constructed in a process similar to known data communication cables. For example, the data communication cables can be formed by twisting insulated wires together at a desired cable pitch to form both twisted wire pairs and a cable core. A fire retardant tape can then be helically wound around the cable core. A metallized tape shield and metallic shield can subsequently be applied by, for example, helical twisting. A jacket layer can then be extruded and cured through a process such as e-beam curing.

Examples

Table 1 evaluates the fire retardant performance of two data communication cables. Each of the two data communication cables are formed in accordance to cable 400 of FIG. 4 with the cable of Example 2 (inventive) including the fire retardant tape (430 in FIG. 4) while the cable of Example 1 (comparative) omits the fire retardant tape. The fire retardant tape of Example 2 (inventive) is Neptape® NTS188 from Neptco, Inc. (Pawtucket, R.I.). The data communication cables of Examples 1 and 2 were evaluated using the test standards of FT-4/IEEE 1202 LS which subjects cables to a 70,000 Btu/hr flaming ignition source for 20 minutes and then evaluates whether the cable exhibited acceptable flame height and smoke release.

TABLE 1

| | FT-4/IEEE 1202 LS Requirement | Example 1 (Comparative) | | Example 2 (Inventive) | |
|---|---|---|---|---|---|
| | | Result | Pass/Fail | Result | Pass/Fail |
| Flame Height | 150 cm | 213 cm | FAIL | 118 cm | PASS |
| Peak Smoke RR (m²/s) | 0.25 m²/s or less | 0.04 m²/s | PASS | 0.12 m²/s | PASS |
| Total Smoke Released (m²) | 95 m² or less | 28.7 m² | PASS | 25.5 m² | PASS |
| Overall (Pass/Fail) | All of the above | — | FAIL | — | PASS |

As depicted in Table 1, the inclusion of a fire retardant tape in Example 2 (inventive) improved each of the evaluated IEEE 1202 LS performance metrics and produced a smaller flame, less peak smoke, and released less overall smoke when subjected to a 70,000 Btu/hr flame for 20 minutes than a similar cable of Example 1 (comparative) which did not include the fire retardant tape.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A data communication cable comprising:
a plurality of twisted wire pairs;

a fire retardant tape surrounding the plurality of twisted wire pairs, the fire retardant tape having an about 15% to about 25% overlap;

a metallized tape shield surrounding the fire retardant tape;

a braided metallic shield surrounding the metallized tape shield; and a jacket layer; and wherein the entire data communication cable is halogen-free.

2. The data communication cable of claim 1, wherein the fire retardant tape comprises a fiberglass tape incorporating a fire retardant filler.

3. The data communication cable of claim 1, wherein the fire retardant tape is longitudinally or helically wrapped.

4. The data communication cable of claim 1 comprises two twisted wire pairs, and wherein the data communication cable meets the requirements of American National Standards Institute and the Telecommunications Industry Association ("ANSI/TIA") standard 568-C.2 (2009) for Category 5e cables.

5. The data communication cable of claim 1 comprises four twisted wire pairs, and wherein the data communication cable meets the requirements of ANSI/TIA-568-C.2 (2009) for Category 5e cables.

6. The data communication cable of claim 5 further comprises a cable separator, and wherein the data communication cable meets the requirements of ANSI/TIA-568-C.2 (2009) for Category 6 or Category 6A cables.

7. The data communication cable of claim 6, wherein the cable separator comprises a cross-web separator.

8. The data communication cable of claim 1, wherein the braided metallic shield is helically applied with about 60% or more coverage of the metallized tape shield.

9. The data communication cable of claim 1, wherein each of the twisted wire pairs comprises two insulated wires, and wherein each of the insulated wires comprise a layer of insulation comprising high-density polyethylene.

10. The data communication cable of claim 1, wherein the jacket layer is crosslinked.

11. The data communication cable of claim 10, wherein the jacket layer comprises a crosslinked low-smoke, zero halogen polyolefin.

12. The data communication cable of claim 10, wherein the jacket layer further comprises one or more of magnesium hydroxide and alumina trihydrate.

13. The data communication cable of claim 1 passes National Fire Protection Agency "NFPA" standard 130 (2017).

14. A data communication cable comprising:

a plurality of twisted wire pairs;

a fire retardant tape surrounding the plurality of twisted wire pairs, the fire retardant tape having an about 15% to about 25% overlap;

a cable shield comprising a metallized tape shield and a braided metallic shield; and a jacket layer, wherein the jacket layer comprises a crosslinked low-smoke, zero halogen polyolefin; and wherein the entire data communication cable is halogen-free.

15. The data communication cable of claim 14, wherein the fire retardant tape comprises a fiberglass tape incorporating a fire retardant filler.

16. The data communication cable of claim 14 comprises two twisted wire pairs, and wherein the data communication cable meets the requirements of ANSI/TIA-568-C.2 (2009) for Category 5e cables.

17. The data communication cable of claim 14 comprises four twisted wire pairs, and wherein the data communication cable meets the requirements of ANSI/TIA-568-C.2 (2009) for Category 5e cables.

18. The data communication cable of claim 17 further comprises a cable separator, and wherein the data communication cable meets the requirements of ANSI/TIA-568-C.2 (2009) for Category 6 or Category 6A cables.

19. The data communication cable of claim 14, wherein each of the twisted wire pairs comprises two insulated wires, and wherein each of the insulated wires comprise a layer of insulation comprising high-density polyethylene.

20. The data communication cable of claim 14 passes National Fire Protection Agency "NFPA" standard 130 (2017).

* * * * *